United States Patent
Wu

(10) Patent No.: US 10,097,248 B2
(45) Date of Patent: Oct. 9, 2018

(54) DATA TRANSMISSION METHOD AND APPARATUS

(71) Applicant: Huawei Technologies Co., Ltd., Shenzhen (CN)

(72) Inventor: Ye Wu, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 123 days.

(21) Appl. No.: 15/194,651

(22) Filed: Jun. 28, 2016

(65) Prior Publication Data
US 2016/0308592 A1 Oct. 20, 2016

Related U.S. Application Data

(63) Continuation of application No. PCT/CN2013/090918, filed on Dec. 30, 2013.

(51) Int. Cl.
*H04B 7/0452* (2017.01)
*H04B 7/04* (2017.01)
*H04L 5/00* (2006.01)

(52) U.S. Cl.
CPC .............. *H04B 7/0452* (2013.01); *H04B 7/04* (2013.01); *H04L 5/0007* (2013.01)

(58) Field of Classification Search
CPC ........ H04B 7/0452; H04B 7/04; H04L 5/0007
See application file for complete search history.

(56) References Cited

U.S. PATENT DOCUMENTS

| 6,862,271 | B2 | 3/2005 | Medvedev et al. |
| 2003/0161282 | A1 | 8/2003 | Medvedev et al. |
| 2008/0008264 | A1* | 1/2008 | Zheng ............ H04B 7/06 375/299 |
| 2008/0132282 | A1* | 6/2008 | Liu ............ H04B 7/0671 455/562.1 |
| 2012/0188881 | A1* | 7/2012 | Ma ............ H04B 7/068 370/252 |

(Continued)

FOREIGN PATENT DOCUMENTS

| CN | 1653721 A | 8/2005 |
| CN | 1996785 A | 7/2007 |

(Continued)

OTHER PUBLICATIONS

Adhikary, A. et al., "Joint Spatial Division and Multiplexing," Sep. 6, 2012, pp. 1-44.

(Continued)

*Primary Examiner* — Ajay Cattungal
(74) *Attorney, Agent, or Firm* — Slater Matsil, LLP

(57) ABSTRACT

Disclosed are a data transmission method and apparatus. The method includes encoding a data stream of a first receive end by using a first encoding mode, to obtain a first encoded data stream. The method also includes encoding a data stream of a second receive end by using a second encoding mode, to obtain a second encoded data stream. The method also includes encoding the first encoded data stream and the second encoded data stream by using a third encoding mode, to obtain a to-be-sent data stream. The method also includes sending the to-be-sent data stream to a corresponding receive end by using antennas.

20 Claims, 2 Drawing Sheets

(56) References Cited

U.S. PATENT DOCUMENTS

| | | | | |
|---|---|---|---|---|
| 2013/0064150 A1* | 3/2013 | Hirata | ............... | H04B 7/0665 |
| | | | | 370/310 |
| 2013/0128807 A1* | 5/2013 | Vermani | ............ | H04L 5/0053 |
| | | | | 370/328 |
| 2013/0177115 A1* | 7/2013 | Yang | ..................... | H04B 7/01 |
| | | | | 375/347 |
| 2014/0247838 A1* | 9/2014 | Seok | .................. | H04L 5/0091 |
| | | | | 370/476 |
| 2015/0049736 A1 | 2/2015 | Liu et al. | | |
| 2015/0289147 A1* | 10/2015 | Lou | .................. | H04B 7/0408 |
| | | | | 370/329 |

FOREIGN PATENT DOCUMENTS

| | | |
|---|---|---|
| CN | 103384161 A | 11/2013 |
| WO | 2013007616 A1 | 1/2013 |
| WO | 2013163859 A1 | 11/2013 |

OTHER PUBLICATIONS

Datong, X. et al., "A Two-Step Precoding Scheme for Multi-User Joint Transmission in Coordinated Multi-Point System," IEEE Vehicular Technology Conference (VTC Fall), Sep. 2012, pp. 1-5, Quebec City, QC.

Yu, Z. et al., "Frequency Domain Pre-Equalization With Transmit Precoding for MIMO Broadcast Wireless Channels," IEEE Journal on Selected Areas in Communications, Feb. 2008, pp. 389-400, vol. 26, No. 2.

\* cited by examiner

DATA TRANSMISSION METHOD AND APPARATUS

CROSS-REFERENCE TO RELATED APPLICATIONS

This application is a continuation of International Application No. PCT/CN2013/090918, filed on Dec. 30, 2013, which is hereby incorporated by reference in its entirety.

TECHNICAL FIELD

The present invention relates to the field of communications technologies, and in particular, to a data transmission method and apparatus.

BACKGROUND

Currently, with rapid development of a wireless communications technology, serious shortage of spectrum resources is becoming a bottleneck in development of the wireless communications industry, and how to make full use of limited spectrum resources, improve a spectrum utilization rate to improve a system throughput is one of current hot research subjects. A multiple-input multiple-output (MIMO) technology that uses a spatial degree of freedom and is based on spatial multiplexing is an effective means.

Transmission modes based on the MIMO technology mainly include: a single-user multiple-input multiple-output (Single-User MIMO, SU-MIMO) transmission mode, a multi-user multiple-input multiple-output (Multi-User MIMO, MU-MIMO) transmission mode, a space frequency block coding (SFBC) transmission mode, and the like. Currently, user equipments (UE) support different MIMO transmission modes. Therefore, in the prior art, a base station usually uses multiple MIMO transmission modes to transmit data to UEs.

In the prior art, in a time-frequency resource, the base station cannot use different MIMO transmission modes for different users; therefore, a resource utilization rate is relatively low. A second disadvantage of the

SUMMARY

Embodiments provide a data transmission method and apparatus, to resolve a problem in the prior art that, in some transmission modes, only one user equipment can be scheduled in a time-frequency resource, which causes a relatively low resource utilization rate.

According to a first aspect, a data transmission method is provided. The method includes: encoding a data stream of a first receive end by using a first encoding mode, to obtain a first encoded data stream, where the first encoding mode is an encoding mode corresponding to a transmission mode used by the first receive end. The method also includes encoding a data stream of a second receive end by using a second encoding mode, to obtain a second encoded data stream, where the second encoding mode is an encoding mode corresponding to a transmission mode used by the second receive end. The method also includes encoding the first encoded data stream and the second encoded data stream by using a third encoding mode, to obtain a to-be-sent data stream. The method also includes sending the to-be-sent data stream to a corresponding receive end by using antennas.

With reference to the first aspect, in a first possible implementation manner, the first receive end and the second receive end use a same transmission mode, or the first receive end and the second receive end use different transmission modes.

With reference to the first aspect or the first possible implementation manner of the first aspect, in a second possible implementation manner, the method further includes: determining a first channel matrix that is from a transmit end to the first receive end, and a second channel matrix that is from the transmit end to the second receive end.

With reference to the second possible implementation manner, in a third possible implementation manner, the encoding the first encoded data stream and the second encoded data stream by using a third encoding mode, to obtain a to-be-sent data stream specifically includes: multiplying the first encoded data stream by a first precode to obtain a first to-be-sent data stream, and multiplying the second encoded data stream by a second precode to obtain a second to-be-sent data stream, where the first precode and the second precode are determined by the third encoding mode, and the to-be-sent data stream is a sum of the first to-be-sent data stream and the second to-be-sent data stream.

With reference to the third possible implementation manner, in a fourth possible implementation manner, a product of the first precode and the first channel matrix is greater than a first threshold, and a product of the first precode and the second channel matrix is less than or equal to the first threshold; and a product of the second precode and the second channel matrix is greater than a second threshold, and a product of the second precode and the first channel matrix is less than or equal to the second threshold.

With reference to the third or fourth possible implementation manner, in a fifth possible implementation manner, when the first encoding mode is a closed-loop precoding mode, the encoding a data stream of a first receive end by using a first encoding mode, to obtain a first encoded data stream specifically includes: determining that the product of the first channel matrix and the first precode is a first equivalent channel matrix; and determining the first encoded data stream according to the first encoding mode and the first equivalent channel matrix. When the second encoding mode is a closed-loop precoding mode, the encoding a data stream of a second receive end by using a second encoding mode, to obtain a second encoded data stream includes: determining that the product of the second channel matrix and the second precode is a second equivalent channel matrix; and determining the second encoded data stream according to the second encoding mode and the second equivalent channel matrix.

With reference to the first aspect or any one of the first to the fifth possible implementation manners of the first aspect, in a sixth possible implementation manner, the transmission mode includes: at least one of the following: a single user SU diversity transmission mode and a single-user beamforming SU-beamforming transmission mode, where the SU diversity transmission mode includes at least one of the following: a space frequency block coding SFBC transmission mode, a space time block coding STBC transmission mode, and a cyclic delay diversity CDD transmission mode.

According to a second aspect, a data transmission apparatus is provided. The apparatus includes: a user encoding module, configured to encode a data stream of a first receive end by using a first encoding mode, to obtain a first encoded data stream, and encode a data stream of a second receive end by using a second encoding mode, to obtain a second encoded data stream, where the first encoding mode is an encoding mode corresponding to a transmission mode used by the first receive end, and the second encoding mode is an encoding mode corresponding to a transmission mode used by the second receive end. The apparatus also includes a precoding module, configured to encode the first encoded data stream and the second encoded data stream by using a third encoding mode, to obtain a to-be-sent data stream; and a transmission module, configured to send the to-be-sent data stream to a corresponding receive end by using antennas.

With reference to the second aspect, in a first possible implementation manner, the first receive end and the second receive end use a same transmission mode, or the first receive end and the second receive end use different transmission modes.

With reference to the second aspect or the first possible implementation manner of the second aspect, in a second possible implementation manner, the apparatus further includes: a channel matrix determining module, configured to determine a first channel matrix that is from a transmit end to the first receive end, and a second channel matrix that is from the transmit end to the second receive end.

With reference to the second possible implementation manner, in a third possible implementation manner, the precoding module is specifically configured to: multiply the first encoded data stream by a first precode to obtain a first to-be-sent data stream, and multiply the second encoded data stream by a second precode to obtain a second to-be-sent data stream, where the first precode and the second precode are determined by the third encoding mode, and the to-be-sent data stream is a sum of the first to-be-sent data stream and the second to-be-sent data stream.

With reference to the third possible implementation manner, in a fourth possible implementation manner, a product of the first precode and the first channel matrix is greater than a first threshold, and a product of the first precode and the second channel matrix is less than or equal to the first threshold; and a product of the second precode and the second channel matrix is greater than a second threshold, and a product of the second precode and the first channel matrix is less than or equal to the second threshold.

With reference to the third or fourth possible implementation manner, in a fifth possible implementation manner, the user encoding module is specifically configured to: when the first encoding mode is a closed-loop precoding mode, the encoding a data stream of a first receive end by using a first encoding mode, to obtain a first encoded data stream specifically includes: determining that the product of the first channel matrix and the first precode is a first equivalent channel matrix, and determining the first encoded data stream according to the first encoding mode and the first equivalent channel matrix; and when the second encoding mode is a closed-loop precoding mode, the encoding a data stream of a second receive end by using a second encoding mode, to obtain a second encoded data stream specifically includes: determining that the product of the second channel matrix and the second precode is a second equivalent channel matrix, and determining the second encoded data stream according to the second encoding mode and the second equivalent channel matrix.

With reference to the second aspect or any one of the first to the fifth possible implementation manners of the second aspect, in a sixth possible implementation manner, the MIMO transmission mode includes at least one of the following: a single user SU diversity transmission mode, a single-user beamforming SU-beamforming transmission mode, and a multi-user multiple-input multiple-output MU-MIMO transmission mode, where the SU diversity transmission mode includes at least one of the following: a space frequency block coding SFBC transmission mode, a space time block coding STBC transmission mode, and a cyclic delay diversity CDD transmission mode.

Embodiments provide a data transmission method and apparatus, where a transmit end encodes a data stream of a first receive end and a data stream of a second receive end to obtain a first encoded data stream and a second encoded data stream, and encodes the first encoded data stream and the second encoded data stream to obtain a to-be-sent data stream, and then sends the to-be-sent data stream to a corresponding receive end. Because in the foregoing method, the to-be-sent data stream is obtained by encoding the first encoded data stream and the second encoded data stream, the to-be-sent data stream may be sent by using a time-frequency resource, that is, more than two user equipments may be scheduled in a time-frequency resource, which effectively improves a resource utilization rate.

DETAILED DESCRIPTION OF ILLUSTRATIVE EMBODIMENTS

Figure 1:
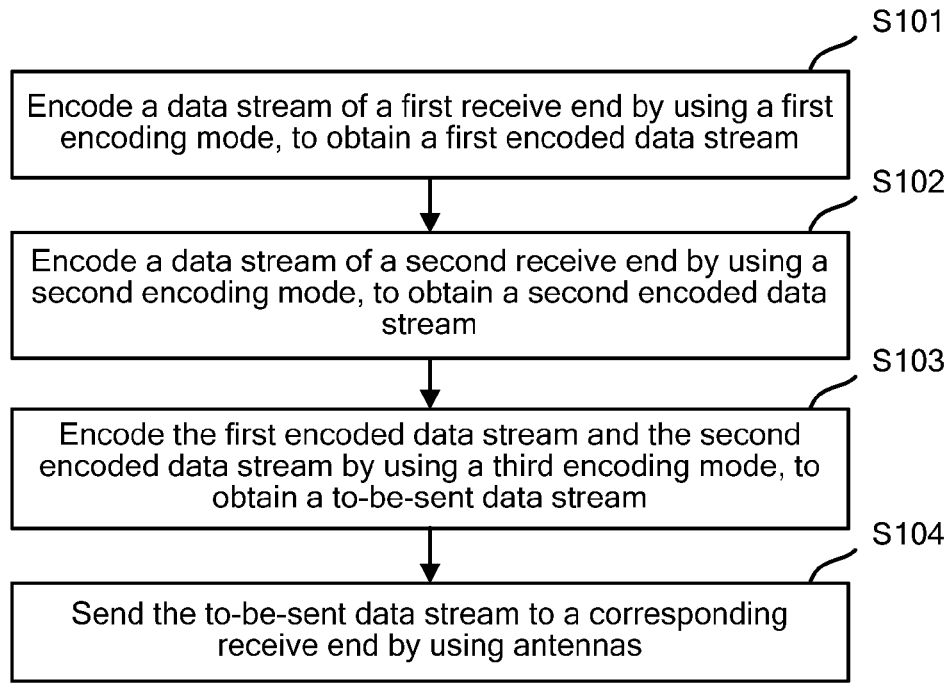
FIG. 1 is a data transmission process according to an embodiment.

In embodiments, encoding is performed on a data stream of a first receive end and a data stream of a second receive end to obtain a first encoded data stream and a second encoded data stream, then encoding is performed on the first encoded data stream and the second encoded data stream to obtain a to-be-sent data stream, and finally the to-be-sent data stream is sent to a receive end. Because in the foregoing method, the to-be-sent data stream is obtained by encoding the first encoded data stream and the second encoded data stream, the to-be-sent data stream may be sent by using a time-frequency resource, that is, more than two user equipments may be scheduled in a time-frequency resource, which effectively improves a resource utilization rate. Specifically, a time-frequency resource may be a transmission time interval (Transmission Time Interval, TTI).

The technology described in this specification may be applied to various communications systems, such as a global system for mobile communications (GSM) system, a general packet radio service (GPRS) system, a code division multiple access (CDMA) system, a time division multiple access (TDMA) system, a wideband code division multiple access (WCDMA) system, a frequency division multiple addressing (FDMA) system, an orthogonal frequency division multiple access (OFDMA) system, a single carrier FDMA (SC-FDMA) system, a long term evolution (LTE) system, or the fifth generation communications system and other such communications systems.

This specification describes various aspects with reference to user equipment and/or a base station.

The user equipment is a wireless terminal. The wireless terminal may refer to a device that provides a user with voice and/or data connectivity, a handheld device with a radio connection function, or another processing device connected to a radio modem. The wireless terminal may communicate with one or more core networks through a radio access network. The wireless terminal may be a mobile terminal, such as a mobile phone and a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a remote station, an access point, a remote terminal, an access terminal, a user terminal, a user agent, a user device, or user equipment.

The base station may be a device that communicates with the wireless terminal over an air interface in an access network by using one or more cells. The base station may be configured to mutually convert a received over-the-air frame and an IP packet and serve as a router between the wireless terminal and a remaining portion of the access network, where the remaining portion of the access network may include an Internet protocol (IP) network. The base station may also coordinate attribute management of the air interface. For example, the base station may be a base station (BTS) in GSM or the CDMA, may be a base station (NodeB) in WCDMA, or may be an evolved NodeB (e-NodeB, evolutional Node B) in the LTE, which is not limited in this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following describes the embodiments in detail with reference to accompanying drawings in this specification.

Embodiment 1

In the prior art, when a user transmits data by using a transmission mode such as an SFBC transmission mode, a transmit end can schedule only one user in a time-frequency resource; therefore, a resource utilization rate is relatively low. However, in this embodiment, encoding is performed on data streams of more than two receive ends, to implement that more than two user equipments are scheduled in a time-frequency resource.

FIG. 1 is a data transmission process according to an embodiment, and the process specifically includes the following steps.

S101. Encode a data stream of a first receive end by using a first encoding mode, to obtain a first encoded data stream.

The first encoding mode is an encoding mode corresponding to a transmission mode used by the first receive end.

S102. Encode a data stream of a second receive end by using a second encoding mode, to obtain a second encoded data stream.

The second encoding mode is an encoding mode corresponding to a transmission mode used by the second receive end.

S103. Encode the first encoded data stream and the second encoded data stream by using a third encoding mode, to obtain a to-be-sent data stream.

S104. Send the to-be-sent data stream to a corresponding receive end by using antennas.

It should be noted that in the foregoing process shown in FIG. 1, steps S101 and S102 are not performed in an order of sequence. In addition, although the foregoing process is described by using the first receive end and the second receive end as an example, actually the data transmission method shown in FIG. 1 is not limited to be applied to two receive ends, and may be applied to three or more receive ends.

Before step S103 shown in FIG. 1, a transmit end may determine a first channel matrix that is from the transmit end to the first receive end, and a second channel matrix that is from the transmit end to the second receive end. In step S103, the method used by the transmit end to encode the first encoded data stream and the second encoded data stream by using the third encoding mode, to obtain the to-be-sent data stream may be: multiplying the first encoded data stream by a first precode to obtain a first to-be-sent data stream, and multiplying the second encoded data stream by a second precode to obtain a second to-be-sent data stream, where the first precode and the second precode are determined by the third encoding mode, and the to-be-sent data stream is a sum of the first to-be-sent data stream and the second to-be-sent data stream.

The determining the first precode and the second precode by using the third encoding mode is specifically: a product of the first precode and the first channel matrix is greater than a first threshold, and a product of the first precode and the second channel matrix is less than or equal to the first threshold; a product of the second precode and the second channel matrix is greater than a second threshold, and a product of the second precode and the first channel matrix is less than or equal to the second threshold.

The following analyzes an effect of the data transmission process shown in FIG. 1 by using an example.

It is assumed that both the first receive end and the second receive end transmit data by using an SFBC transmission mode; and the first encoded data stream and the second encoded data stream that are obtained by encoding the data streams of the two receive ends by using an encoding mode corresponding to the SFBC transmission mode are denoted by $y^{(1)}$ and $y^{(2)}$, respectively. It is assumed that the first channel matrix and the second channel matrix that are from the transmit end to the two receive ends are respectively $H^{(1)}$ and $H^{(2)}$. Then the first precode $T^{(1)}$ determined by using the third encoding mode meets $H^{(1)}T^{(1)}>a_1$, $H^{(2)}T^{(1)} \leq a_1$, and the second precode $T^{(2)}$ determined by using the third encoding mode meets $H^{(1)}T^{(2)} \leq a_2$, $H^{(2)}T^{(2)}>a_2$, where $a_1$ is the first threshold, and $a_2$ is the second threshold. Therefore, the first to-be-sent data stream is $T^{(1)}y^{(1)}$, the second to-be-sent data stream is $T^{(2)}y^{(2)}$, and the determined to-be-sent data stream is $T^{(1)}y^{(1)}+T^{(2)}y^{(2)}$.

For the first receive end, a signal $r^{(1)}$ received by the first receive end is: a product of the channel matrix $H^{(1)}$ of the first receive end and the to-be-sent data stream+white Gaussian noise, that is, $r^{(1)}=H^{(1)}(T^{(1)}y^{(1)}+T^{(2)}y^{(2)})+n^{(1)}$, where $n^{(1)}$ is the white Gaussian noise that is from the transmit end to the first receive end. However, because $T^{(1)}$ meets $H^{(1)}T^{(1)}>a_1$, $H^{(2)}T^{(1)} \leq a_1$, $r^{(1)} \approx H^{(1)}T^{(1)}y^{(1)}+n^{(1)}$.

Accordingly, a signal $r^{(2)}$ received by the second receive end is $r^{(2)}=H^{(2)}(T^{(1)}y^{(1)}+T^{(2)}y^{(2)})+n^{(2)}$, where $n_{(2)}$ is white Gaussian noise that is from the transmit end to the second receive end. However, because $T^{(2)}$ meets $H^{(1)}T^{(2)} \leq a_2$, $H^{(2)}T^{(2)}>a_2$, $r^{(2)} \approx H^{(2)}T^{(2)}y^{(2)}+n^{(2)}$.

It may be seen that, even if both the first receive end and the second receive end transmit data by using the SFBC transmission mode, in this embodiment, the first encoded data stream $y^{(1)}$ of the first receive end is multiplied by the first precode $T^{(1)}$, and the second encoded data stream $y^{(2)}$ of the second receive end is multiplied by the second precode $T^{(2)}$, and then after the to-be-sent data stream $T^{(1)} y^{(1)}+T^{(2)} y^{(2)}$ is obtained by adding up two obtained products, the to-be-sent data stream may be sent to the two receive ends by using a time-frequency resource, and the two receive ends do not cause much interference.

In addition, in this embodiment, the first receive end and the second receive end may use a same transmission mode (for example, the foregoing two receive ends use the SFBC transmission mode), or may use different transmission modes. By using Embodiment 2, the following describes a process in which two or more receive ends transmit data by using different transmission modes.

Embodiment 2

Figure 2:
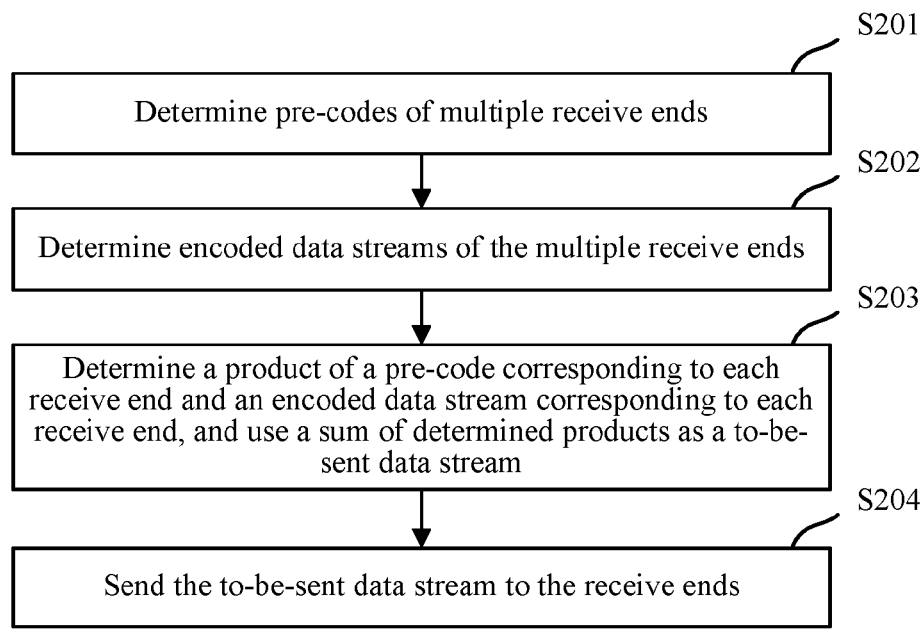
FIG. 2 is another data transmission process according to an embodiment.

FIG. 2 is another data transmission process according to an embodiment, and the process specifically includes the following steps.

When sending data to multiple receive ends, a transmit end needs to determine a precode of each receive end. When the multiple receive ends do not use a same MIMO transmission mode within one TTI, for example, one receive end uses an SU diversity transmission mode, but the other receive ends use an MU-MIMO transmission mode, the transmit end needs to determine an encoded data stream of each receive end, and further determine a to-be-sent data stream, to transmit the data.

S201. Determine precodes of multiple receive ends.

Precoding may be in an open-loop precoding mode, or may be in a closed-loop precoding mode.

Optionally, when the open-loop precoding mode is used, the precoding does not rely on information about channels that are from the transmit end to the receive ends. In specific implementation, a person skilled in the art may use, according to specific implementation manners provided in the embodiments of this specification, multiple existing technical solutions that can be selected, and details are not described herein again.

Optionally, when the closed-loop precoding mode is used, the precoding relies on information about channels that are from the transmit end to the receive ends. Further optionally, before determining the precodes of the multiple receive ends, the transmit end may determine a channel matrix that is from the transmit end to the multiple receive ends. In this embodiment of the present invention, the transmit end may be a base station, and the receive ends may be wireless terminals. A method used by the transmit end to determine a channel matrix that is from the transmit end to a receive end may be: determining, by the transmit end, a channel matrix that is from all transmit antennas of the transmit end to all receive antennas of the receive end.

For example, it is assumed that the transmit end has M transmit antennas, where M is a positive integer greater than 1; the transmit end needs to transmit data streams to K UEs, where K is a positive integer greater than 1; and the $k^{th}$ UE in the K UEs has $N_k$ receive antennas. Then, for the $k^{th}$ UE, the transmit end may determine a channel matrix that is from the M transmit antennas of the transmit end to the $N_k$ receive antennas of the $k^{th}$ UE, and the channel matrix is denoted by $H^{(k)}$.

Optionally, when the transmit end determines a precode corresponding to any receive end (hereinafter referred to as a first receive end), the determined precode needs to meet the following conditions: a product of the precode of the first receive end and a channel matrix that is from the transmit end to the first receive end is greater than a set threshold (a same threshold or different thresholds may be set for the receive ends), and a product of the precode of the first receive end and a channel matrix that is from the transmit end to a second receive end is less than or equal to the set threshold, where the first receive end is any one of the multiple receive ends, and the second receive end is another receive end except the first receive end. Further optionally, the threshold may be 0.

Optionally, when determining a precode corresponding to a receive end, the transmit end may use a block diagonalization (BD) method, so that the precode corresponding to the receive end is determined according to a determined channel matrix of each receive end.

Specifically, it is assumed that a precode that is corresponding to the $k^{th}$ receive end and determined by the transmit end by using the BD method is $T_{(K)}$, then $T_{(K)}$ and $H^{(1)}, H^{(2)}, H^{(3)}$, $$H^{(1)}T^{(k)} = 0$$
$$\vdots$$
$$H^{(k-1)}T^{(k)} = 0$$
$$H^{(k)}T^{(k)} \neq 0$$
$$H^{(k+1)}T^{(k)} = 0$$

..., $H^{(k)}$ meet the following conditions: $H^{(K)}T^{(k)}=0$.

Optionally, when determining a precode corresponding to a receive end, the transmit end may use a signal-to-leakage-and-noise ratio SLNR method, so that the precode corresponding to the receive end is determined according to a determined channel matrix of each receive end.

Specifically, a precode that is corresponding to the $k^{th}$ receive end and determined by the transmit end by using the SLNR method is $T_{(K)}$; and it is assumed that a set threshold is a, $$H^{(1)}T^{(k)} < a$$
$$\vdots$$
$$H^{(k-1)}T^{(k)} < a$$
$$H^{(k)}T^{(k)} > a$$
$$H^{(k+1)}T^{(k)} < a$$

then $T_{(K)}$ and $H^{(1)}, H^{(2)}, H^{(3)}, \ldots, H^{(k)}$ meet the following conditions: $H^{(K)}T^{(k)}<a$.

S202. Determine encoded data streams of the multiple receive ends.

When the multiple receive ends do not use a same MIMO transmission mode, for MIMO transmission modes used by the receive ends, the transmit end encodes, by using encoding modes corresponding to the MIMO transmission modes, data streams to be sent to the receive ends, to obtain encoded data streams corresponding to the receive ends.

The foregoing example is still used. It is assumed that a MIMO transmission mode used by the $k^{th}$ receive end is an MU-MIMO transmission mode. Then the transmit end encodes, by using an encoding mode corresponding to the MU-MIMO transmission mode, a data stream to be sent to the $k^{th}$ receive end, to obtain an encoded data stream that is corresponding to the $k^{th}$ receive end, and the encoded data stream is denoted by $y^{(k)}$.

S203. Determine a product of a precode corresponding to each receive end and an encoded data stream corresponding to each receive end, and use a sum of determined products as a to-be-sent data stream.

That is, the transmit end determines, for one receive end, a product of a precode that is determined in step S201 and corresponding to the receive end and an encoded data stream that is determined in step S202 and corresponding to the receive end, and uses a sum of determined products as a to-be-sent data stream.

The foregoing example is still used. For the $k^{th}$ receive end, a precode that is determined by the transmit end in step S201 and corresponding to the $k^{th}$ receive end is $T^{(k)}$, and an encoded data stream that is determined by the transmit end in step S202 and corresponding to the $k^{th}$ receive end is $y^{(k)}$. Then the determined product in step S203 is $T^{(k)}y^{(k)}$, and the to-be-sent data stream is $Sum_{(k=1,2,\ldots,K)}T^{(k)}y^{(k)}$.

S204. Send the to-be-sent data stream to the receive end.

Specifically, the transmit end may send the to-be-sent data stream $Sum_{(k=1,2,\ldots,K)}T^{(k)}y^{(k)}$ to K receive ends in a time-frequency resource within one TTI.

The following analyzes an effect of the data transmission performed by using the method shown in FIG. 2.

The foregoing example is still used. For the $k^{th}$ receive end, a signal $r^{(k)}$ received by the $k^{th}$ receive end is $r^{(k)}=H^{(k)}(sum_{(k=1,2,\ldots,K)}T^{(k)}y^{(k)})+n^{(k)}$, where $n^{(k)}$ is white noise of a receive antenna of the $k^{th}$ receive end. However, the channel matrix $H^{(k)}$ of the $k^{th}$ receive end has a relatively high correlation with only the precode $T^{(k)}$ corresponding to the $k^{th}$ receive end, while has a relatively low correlation or no correlation with a precode corresponding to another receive end, that is, or $H^{(k)}T^{(i)}=0$, $i\neq k$, $0\leq i\leq K$, or $H^{(k)}T^{(i)}\approx 0$, $i\neq k$. Therefore, the received signal $r^{(k)}$ of the $k^{th}$ receive end in the foregoing formula is equal to $r^{(k)}=H^{(k)}T^{(k)}y^{(k)}+n^{(k)}$, that is, a data stream $T^{(i)}y^{(i)}$, $i\neq k$ to be received by another receive end does not cause much interference to a data stream $T^{(k)}y^{(k)}$ to be received by the $k^{th}$ receive end. In other words, even if multiple MIMO transmission modes are used to transmit data streams to the K receive ends within one TTI, receiving, by the $k^{th}$ receive end, data by using a MIMO transmission mode of the $k^{th}$ receive end neither interferes with data receiving of another receive end, nor is interfered by the data receiving of the another receive end.

Therefore, in this embodiment, by using the foregoing data transmission method shown in FIG. 2, multiple MIMO transmission modes may be used within one TTI to transmit data to different receive ends, and there is not much interference between the multiple MIMO transmission modes; therefore, a time-frequency resource in one TTI may be applied to the multiple MIMO transmission modes. For a MIMO transmission mode, even if a quantity of receive ends that use the MIMO transmission mode is not large, in a time-frequency resource of the TTI that is used to transmit data by using the MIMO transmission mode, another MIMO transmission mode may be used to transmit data, which breaks through a limit in the prior art in which the time-frequency resource in one TTI is applied to only one MIMO transmission mode, thereby effectively saving the time-frequency resource in the TTI, improving a utilization rate of the time-frequency resource, and improving a system throughput.

In addition, because in this embodiment, the time-frequency resource in one TTI is applied to more than one MIMO transmission mode, flexibility of a system service is also improved.

Further, in step S202 shown in FIG. 2, when determining an encoded data stream for any receive end (hereinafter referred to as a first receive end), the transmit end needs to determine whether an encoding mode corresponding to the MIMO transmission mode that is used by the first receive end relies on channel information, that is, determine whether the encoding mode corresponding to the MIMO transmission mode that is used by the first receive end is a closed-loop precoding mode. If the encoding mode corresponding to the MIMO transmission mode that is used by the first receive end is the closed-loop precoding mode, an equivalent channel matrix that is from the transmit end to the first receive end is determined, where the equivalent channel matrix is a product of the channel matrix that is from the transmit end to the first receive end and the precode of the first receive end, the first receive end is any one of the multiple receive ends that use a closed-loop precoding mode as an MIMO transmission mode. The encoded data stream of the first receive end is determined according to the closed-loop precoding mode of the first receive end and the equivalent channel matrix. If the encoding mode corresponding to the MIMO transmission mode that is used by the first receive end is not the closed-loop precoding mode, the encoded data stream of the first receive end is directly determined according to the MIMO transmission mode used by the first receive end.

Further, when the encoding mode corresponding to the MIMO transmission mode that is used by the first receive end is the closed-loop precoding mode, the encoded data stream $y^{(k)}$ corresponding to the first receive end is determined by using a formula $y^{(k)}=g(H^{(k)}*T^{(k)})b^{(k)}$. When the encoding mode corresponding to the MIMO transmission mode that is used by the first receive end is not the closed-loop precoding mode, the encoded data stream $y^{(k)}$ corresponding to the first receive end is determined by using a formula $y^{(k)}=f(b^{(k)})$, where k represents the $k^{th}$ receive end (that is the first receive end) in the K receive ends, $H^{(k)}$ is the channel matrix that is from the transmit end to the first receive end, $T^{(k)}$ is the precode corresponding to the first receive end, $b^{(k)}$ is a data stream to be sent to the first receive end, g( ) represents a closed-loop precoding mode that is used by the first receive end and corresponding to the MIMO transmission mode, and f( ) represents a non-closed-loop precoding mode that is used by the first receive end and corresponding to the MIMO transmission mode.

For example, in an existing MIMO transmission mode, an encoding mode corresponding to an SU-beamforming transmission mode and an MU-MIMO transmission mode is a closed-loop precoding mode, but an encoding mode corresponding to an SFBC transmission mode is a non-closed-loop precoding mode; therefore, when the transmit end determines that a MIMO transmission mode that is used by the receive end is the SU-beamforming transmission mode or the MU-MIMO transmission mode, it is determined that the encoding mode that is used by the first receive end and corresponding to the MIMO transmission mode is the closed-loop precoding mode; or when the transmit end determines that a MIMO transmission mode that is used by the receive end is the SFBC transmission mode, it is determined that the encoding mode that is used by the first receive end and corresponding to the MIMO transmission mode is the non-closed-loop precoding mode.

The following describes the method used by a transmit end to determine an encoded data stream corresponding to a receive end by using an SFBC transmission mode and an MU-MIMO transmission mode as an example.

When the transmit end determines that a MIMO transmission mode that is used by the receive end is the SFBC transmission mode, it is determined that the encoding mode corresponding to the SFBC transmission mode is the non-closed-loop precoding mode. Therefore, the encoded data stream $y^{(k)}$ corresponding to the receive end is determined by using a formula $y^{(k)}=f(b^{(k)})$. It is assumed that $y^{(k)}=[y^{(k)}(0,i), y^{(k)}(1,i)]^T$ indicates baseband modulation output signals of a layer 1 and a layer 2 at the $i^{th}$ resource element (Resource Element, RE) that are output in an encoding mode corresponding to the SFBC transmission mode), and $b^{(k)}=[b^{(k)}(0,i), b^{(k)}(1,i)]^T$ is a baseband signal that is modulated on a constellation diagram, such as a quadrature amplitude modulation (QAM) signal, the encoded data stream that is corresponding to the receive end and determined by using the encoding mode corresponding to the SFBC transmission mode is $$y^{(k)} = f(b^{(k)}) = \begin{bmatrix} y^{(k)}(0, 2i) \\ y^{(k)}(1, 2i) \\ y^{(k)}(0, 2i+1) \\ y^{(k)}(1, 2i+1) \end{bmatrix} = \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(b^{(k)}(0, i)) \\ \text{Re}(b^{(k)}(1, i)) \\ \text{Im}(b^{(k)}(0, i)) \\ \text{Im}(b^{(k)}(1, i)) \end{bmatrix}.$$

When a MIMO transmission mode used by the receive end is the MU-MIMO transmission mode, the transmit end determines that the encoding mode corresponding to the MU-MIMO transmission mode is the closed-loop precoding mode; therefore, the encoded data stream $y^{(k)}$ corresponding to the receive end is determined by using a formula $y^{(k)}=g(H^{(k)}*T^{(k)})b^{(k)}$. There are two types of encoding modes corresponding to the MU-MIMO transmission mode: a zero forcing (ZF) encoding mode and a matched filtering (MF) encoding mode. The following describes the ZF encoding mode and the MF encoding mode.

When the ZF encoding mode is used, the determined encoded data stream corresponding to the receive end is $y^{(k)}=g(H^{(k)}*T^{(k)})b^{(k)}=(H^{(k)}*T^{(k)})^H(H^{(k)}*T^{(k)}(H^{(k)}*T^{(k)})^H)^{-1})b^{(k)}$.

When the MF encoding mode is used, the determined encoded data stream corresponding to the receive end is $y^{(k)}=g(H^{(k)}*T^{(k)})b^{(k)}=(H^{(k)}*T^{(k)})^H b^{(k)}$.

The foregoing describes the method used to determine the encoded data stream by merely using the encoding mode that is corresponding to the SFBC transmission mode and the ZF encoding mode and the MF encoding mode that are corresponding to the MU-MIMO transmission mode as an example, and an encoding mode corresponding to another MIMO transmission mode is not described herein again.

Furthermore, when the transmit end determines that an encoding mode that is used by a receive end and corresponding to the MIMO transmission mode is the closed-loop precoding mode, before the transmit end determines an encoded data stream $y^{(k)}$ corresponding to the receive end by using the formula $y^{(k)}=g(H^{(k)}*T^{(k)})b^{(k)}$, the transmit end further needs to determine a total quantity of receive antennas of other receive ends except the receive end, determine a difference between a sum of transmit antennas of the transmit end and the total quantity, and determine that a quantity of rows, that is, $H^{(k)}*T^{(k)}$, is not greater than the difference. That is, when determining that an encoding mode that is used by the $k^{th}$ receive end and corresponding to the MIMO transmission mode is the closed-loop precoding mode, the transmit end needs to determine that the quantity of rows, that is, $H^{(k)}*T^{(k)}$, is not greater than M−sum $_{(i=1,\ldots k-1,k+1,\ldots K)}N_i$, where M is a sum of the transmit antennas of the transmit end, $N_i$ is a quantity of receive antennas of the $i^{th}$ receive end, and sum $_{(i=1,\ldots k-1,k+1,\ldots K)}N_i$ is a sum of receive antennas of other receive ends except the $k^{th}$ receive end in the K receive ends.

In addition, in this embodiment, the foregoing MIMO transmission mode includes at least one of the following: an SU diversity transmission mode, a SU-beamforming transmission mode, and an MU-MIMO transmission mode. The SU diversity transmission mode includes at least one of the following: an SFBC transmission mode and a cyclic delay diversity (CDD) transmission mode. Certainly, the foregoing MIMO transmission mode may further include another MIMO transmission mode, and details are not described herein again. In addition, the foregoing method may be also applied to a single antenna transmission mode, such as a single-input single-output (SISO) transmission mode, a single-input multiple-output (SIMO) transmission mode, or a multiple-input single-output (MISO).

The foregoing are the data transmission methods provided in the embodiments. Based on a same idea of the present invention, the embodiments further provide a data transmission apparatus. The apparatus is described in Embodiment 3.

Embodiment 3

Figure 3:
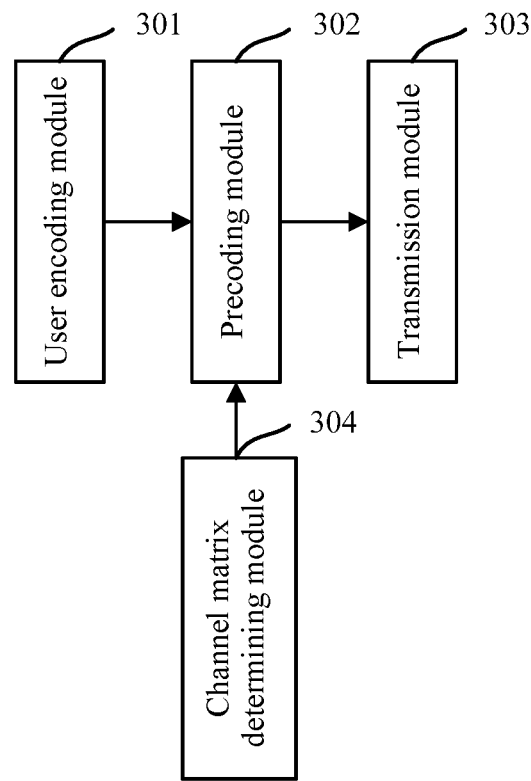
FIG. 3 is a schematic structural diagram of a data transmission apparatus according to an embodiment.

FIG. 3 is a schematic structural diagram of a data transmission apparatus according to an embodiment, and the apparatus specifically includes: a user encoding module 301, configured to encode a data stream of a first receive end by using a first encoding mode, to obtain a first encoded data stream, and encode a data stream of a second receive end by using a second encoding mode, to obtain a second encoded data stream, where the first encoding mode is an encoding mode corresponding to a transmission mode used by the first receive end, and the second encoding mode is an encoding mode corresponding to a transmission mode used by the second receive end. The apparatus also includes a precoding module 302, configured to encode the first encoded data stream and the second encoded data stream by using a third encoding mode, to obtain a to-be-sent data stream. The apparatus also includes a transmission module 303, configured to send the to-be-sent data stream to a corresponding receive end by using antennas.

The first receive end and the second receive end use a same transmission mode, or the first receive end and the second receive end use different transmission modes.

The apparatus further includes: a channel matrix determining module 304, configured to determine a first channel matrix that is from a transmit end to the first receive end, and a second channel matrix that is from the transmit end to the second receive end.

The precoding module 302 is specifically configured to: multiply the first encoded data stream by a first precode to obtain a first to-be-sent data stream, and multiply the second encoded data stream by a second precode to obtain a second to-be-sent data stream, where the first precode and the second precode are determined by the third encoding mode, and the to-be-sent data stream is a sum of the first to-be-sent data stream and the second to-be-sent data stream.

A product of the first precode and the first channel matrix is greater than a first threshold, and a product of the first precode and the second channel matrix is less than or equal to the first threshold; and a product of the second precode and the second channel matrix is greater than a second threshold, and a product of the second precode and the first channel matrix is less than or equal to the second threshold.

The user encoding module 301 is specifically configured to: when the first encoding mode is a closed-loop precoding mode, the encoding a data stream of a first receive end by using a first encoding mode, to obtain a first encoded data stream specifically includes: determining that the product of the first channel matrix and the first precode is a first equivalent channel matrix, and determining the first encoded data stream according to the first encoding mode and the first equivalent channel matrix; and when the second encoding mode is a closed-loop precoding mode, the encoding a data stream of a second receive end by using a second encoding mode, to obtain a second encoded data stream specifically includes: determining that the product of the second channel matrix and the second precode is a second equivalent channel matrix, and determining the second encoded data stream according to the second encoding mode and the second equivalent channel matrix.

The MIMO transmission mode includes at least one of the following: a single user SU diversity transmission mode, a single-user beamforming SU-beamforming transmission mode, and a multi-user multiple-input multiple-output MU-MIMO transmission mode, where the SU diversity transmission mode includes at least one of the following: a space frequency block coding SFBC transmission mode, a space time block coding STBC transmission mode, and a cyclic delay diversity CDD transmission mode.

The data transmission apparatus provided in this embodiment may be an apparatus in various forms. For example, each module may be integrated in a chip, or is implemented by means of hardware circuit construction, or the like.

Specifically, the foregoing data transmission apparatus shown in FIG. 3 may be located in a base station. Division between the foregoing modules is merely logical division, and in a practical application, functions of some or all of the modules may be integrated in a processor or a chip.

Figure 4:
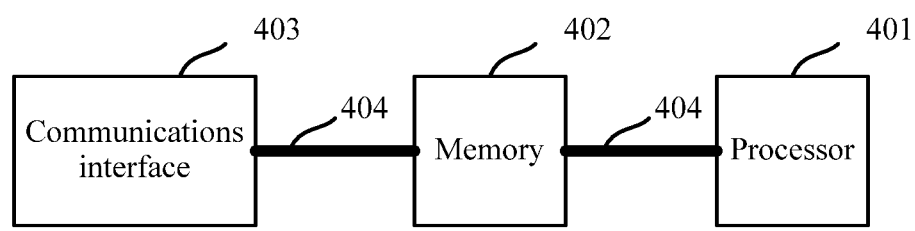
FIG. 4 is a schematic structural diagram of hardware of a data transmission apparatus according to an embodiment.

FIG. 4 is a schematic structural diagram of hardware of a data transmission apparatus according to an embodiment, and the apparatus specifically includes: a processor 401, a memory 402, a communications interface 403, and a bus 404, where the processor 401, the memory 402, and the communications interface 403 are connected to each other by using the bus 404.

The bus 404 may be used to transmit data or a signal between two devices or components. For example, a bus may specifically include: an address bus, a data bus, a control bus, and the like. For ease of illustration, the bus is merely represented by a bold line in FIG. 4, which does not indicate that there is only one bus or one type of bus.

The communications interface 403 is configured to receive a modulated signal.

The memory 402 is configured to store a program. Specifically, the program may include program code, where the program code includes a computer operation instruction used for implementing the method provided in the foregoing embodiment. The memory 402 may include a random access memory (RAM for short), and may further include a non-volatile memory, such as at least one disk memory.

The processor 401 implements the program stored in the memory 402, to implement either of the method provided in Embodiment 1 or Embodiment 2. For example, the method includes: encoding a data stream of a first receive end by using a first encoding mode, to obtain a first encoded data stream, where the first encoding mode is an encoding mode corresponding to a transmission mode used by the first receive end; encoding a data stream of a second receive end by using a second encoding mode, to obtain a second encoded data stream, where the second encoding mode is an encoding mode corresponding to a transmission mode used by the second receive end; encoding the first encoded data stream and the second encoded data stream by using a third encoding mode, to obtain a to-be-sent data stream; and sending the to-be-sent data stream to a corresponding receive end by using antennas.

This embodiment further provides a storage medium, and the storage medium stores a computer program. The computer program is configured to implement either of the data transmission methods provided in Embodiment 1 or Embodiment 2. For example, the data transmission method includes: encoding a data stream of a first receive end by using a first encoding mode, to obtain a first encoded data stream, where the first encoding mode is an encoding mode corresponding to a transmission mode used by the first receive end; encoding a data stream of a second receive end by using a second encoding mode, to obtain a second encoded data stream, where the second encoding mode is an encoding mode corresponding to a transmission mode used by the second receive end; encoding the first encoded data stream and the second encoded data stream by using a third encoding mode, to obtain a to-be-sent data stream; and sending the to-be-sent data stream to a corresponding receive end by using antennas.

The computer program stored in the storage medium includes program code, where the program code includes a computer operation instruction for implementing the method provided in this embodiment of the present invention. The storage medium may include a random access memory (RAM for short), and may further include a non-volatile memory, such as at least one disk memory.

Embodiments provide a data transmission method and apparatus, where a transmit end encodes a data stream of a first receive end and a data stream of a second receive end to obtain a first encoded data stream and a second encoded data stream, and encodes the first encoded data stream and the second encoded data stream to obtain a to-be-sent data stream, and then sends the to-be-sent data stream to a corresponding receive end. Because in the foregoing method, the to-be-sent data stream is obtained by encoding the first encoded data stream and the second encoded data stream, the to-be-sent data stream may be sent by using a time-frequency resource, that is, more than two user equipments may be scheduled in a time-frequency resource, which effectively improves a resource utilization rate.

A person skilled in the art should understand that the embodiments may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

In a typical configuration, a computer device includes one or more processors (CPU), one or more input/output interface, one or more network interfaces, and one or more memories.

The memory may include forms such as a non-persistent storage in a computer readable medium, a random access memory (RAM) and/or a non-volatile memory, such as a read-only memory (ROM) or a flash memory (flash RAM). The memory is an example of the computer readable medium.

The computer readable medium includes a persistent medium and a non-persistent medium, a removable medium and a non-removable medium, which implement information storage by using any method or technology. Information may be a computer readable instruction, a data structure, a module of a program or other data. Examples of a storage medium of a computer include, but are not limited to: a phase change memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage device, a cassette tape, disk and tape memory or another magnetic storage device, or any other non-transmission media, which may be configured to store information that can be accessed by a computer device. According to limitations of this specification, the computer readable medium does not include a non-transitory medium (transitory media), such as a modulated data signal and a modulated carrier.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to the embodiments of the present application without departing from the spirit and scope of the embodiments of the present application. The present application is intended to cover these modifications and variations provided that they fall within the scope of protection defined by the following claims and their equivalent technologies.

What is claimed is:

1. A method, comprising:
   encoding a data stream of a first receive end using a first encoding mode, to obtain a first encoded data stream, wherein the first encoding mode corresponds to a Multiple Input Multiple Output (MIMO) transmission mode used by the first receive end, wherein the first encoding mode is a first MIMO precoding mode;
   encoding a data stream of a second receive end using a second encoding mode, to obtain a second encoded data stream, wherein the second encoding mode corresponds to a MIMO transmission mode used by the second receive end, wherein the second encoding mode is a second MIMO precoding mode;
   encoding the first encoded data stream and the second encoded data stream using a third encoding mode, to obtain a to-be-sent data stream; and
   sending the to-be-sent data stream to a corresponding receive end using a plurality of antennas.

2. The method according to claim 1, wherein the first receive end and the second receive end use a same MIMO transmission mode, or the first receive end and the second receive end use different MIMO transmission modes.

3. The method according to claim 1, further comprising:
   determining a first channel matrix that is from a transmit end to the first receive end, and a second channel matrix that is from the transmit end to the second receive end.

4. The method according to claim 3, wherein encoding the first encoded data stream and the second encoded data stream using the third encoding mode further comprises:
   multiplying the first encoded data stream by a first precode to obtain a first to-be-sent data stream, and multiplying the second encoded data stream by a second precode to obtain a second to-be-sent data stream, wherein the first precode and the second precode are determined by the third encoding mode, and the to-be-sent data stream is a sum of the first to-be-sent data stream and the second to-be-sent data stream.

5. The method according to claim 4, wherein:
   a product of the first precode and the first channel matrix is greater than a first threshold, and a product of the first precode and the second channel matrix is less than or equal to the first threshold; and
   a product of the second precode and the second channel matrix is greater than a second threshold, and a product of the second precode and the first channel matrix is less than or equal to the second threshold.

6. The method according to claim 4, wherein:
   the first encoding mode is a closed-loop precoding mode, and encoding the data stream of a first receive end using the first encoding mode further comprises:
      determining that the product of the first channel matrix and the first precode is a first equivalent channel matrix; and
      determining the first encoded data stream according to the first encoding mode and the first equivalent channel matrix; or the second encoding mode is a closed-loop precoding mode, and encoding the data stream of the second receive end using the second encoding mode further comprises:
  determining that the product of the second channel matrix and the second precode is a second equivalent channel matrix; and
  determining the second encoded data stream according to the second encoding mode and the second equivalent channel matrix.

7. The method according to claim 1, wherein the MIMO transmission mode used by the first receive end and the MIMO transmission mode used by the second receive end each comprise one or more of the following: a single user (SU) diversity transmission mode and a single-user beamforming (SU-beamforming) transmission mode; and
  wherein the SU diversity transmission mode comprises one or more of the following: a space frequency block coding (SFBC) transmission mode, a space time block coding (STBC) transmission mode, and a cyclic delay diversity (CDD) transmission mode.

8. An apparatus, comprising:
  a user encoding module, configured to:
    encode a data stream of a first receive end using a first encoding mode, to obtain a first encoded data stream, wherein the first encoding mode corresponds to a Multiple Input Multiple Output (MIMO) transmission mode used by the first receive end, wherein the first encoding mode is a first MIMO precoding mode; and
    encode a data stream of a second receive end using a second encoding mode, to obtain a second encoded data stream, wherein the second encoding mode corresponds to a MIMO transmission mode used by the second receive end, wherein the second encoding mode is a second MIMO precoding mode;
  a precoding module, configured to encode the first encoded data stream and the second encoded data stream using a third encoding mode, to obtain a to-be-sent data stream; and
  a transmission module, configured to send the to-be-sent data stream to a corresponding receive end using a plurality of antennas.

9. The apparatus according to claim 8, wherein the first receive end and the second receive end use a same MIMO transmission mode, or the first receive end and the second receive end use different MIMO transmission modes.

10. The apparatus according to claim 8, further comprising:
  a channel matrix determining module, configured to determine a first channel matrix that is from a transmit end to the first receive end, and a second channel matrix that is from the transmit end to the second receive end.

11. The apparatus according to claim 10, wherein the precoding module is further configured to:
  multiply the first encoded data stream by a first precode to obtain a first to-be-sent data stream, and multiply the second encoded data stream by a second precode to obtain a second to-be-sent data stream, wherein the first precode and the second precode are determined by the third encoding mode, and the to-be-sent data stream is a sum of the first to-be-sent data stream and the second to-be-sent data stream.

12. The apparatus according to claim 11, wherein:
  a product of the first precode and the first channel matrix is greater than a first threshold, and a product of the first precode and the second channel matrix is less than or equal to the first threshold; and
  a product of the second precode and the second channel matrix is greater than a second threshold, and a product of the second precode and the first channel matrix is less than or equal to the second threshold.

13. The apparatus according to claim 11, wherein:
  the first encoding mode is a closed-loop precoding mode, and encoding the data stream of the first receive end using the first encoding mode, to obtain the first encoded data stream further comprises:
    determining that the product of the first channel matrix and the first precode is a first equivalent channel matrix; and
    determining the first encoded data stream according to the first encoding mode and the first equivalent channel matrix; or
  the second encoding mode is a closed-loop precoding mode, and encoding the data stream of the second receive end using the second encoding mode further comprises:
    determining that the product of the second channel matrix and the second precode is a second equivalent channel matrix; and
    determining the second encoded data stream according to the second encoding mode and the second equivalent channel matrix.

14. The apparatus according to claim 8, wherein the MIMO transmission mode used by the first receive end and the MIMO transmission mode used by the second receive end each comprise one or more of the following: a single user (SU) diversity transmission mode, a single-user beamforming (SU-beamforming) transmission mode, and a multi-user multiple-input multiple-output (MU-MIMO) transmission mode; and
  wherein the SU diversity transmission mode comprises one or more of the following: a space frequency block coding (SFBC) transmission mode, a space time block coding (STBC) transmission mode, and a cyclic delay diversity (CDD) transmission mode.

15. An apparatus, comprising:
  a plurality of antennas;
  a processor, and
  a non-transitory processor-readable medium having processor-executable instructions stored thereon that, when executed by the processor, cause the processor to:
    encode a data stream of a first receive end using a first encoding mode, to obtain a first encoded data stream, wherein the first encoding mode corresponds to a Multiple Input Multiple Output (MIMO) transmission mode used by the first receive end, wherein the first encoding mode is a first MIMO precoding mode;
    encode a data stream of a second receive end using a second encoding mode, to obtain a second encoded data stream, wherein the second encoding mode corresponds to a MIMO transmission mode used by the second receive end, wherein the second encoding mode is a second MIMO precoding mode;
    encode the first encoded data stream and the second encoded data stream using a third encoding mode, to obtain a to-be-sent data stream; and
  a transmitter, configured to send the to-be-sent data stream to a corresponding receive end using the plurality of antennas.

16. The apparatus according to claim 15, wherein the first receive end and the second receive end use a same MIMO transmission mode, or the first receive end and the second receive end use different MIMO transmission modes.

17. The apparatus according to claim 15, wherein the instructions further cause the processor to determine a first channel matrix that is from a transmit end to the first receive end, and a second channel matrix that is from the transmit end to the second receive end.

18. The apparatus according to claim 17, wherein the instructions further cause the processor to multiply the first encoded data stream by a first precode to obtain a first to-be-sent data stream, and multiply the second encoded data stream by a second precode to obtain a second to-be-sent data stream, wherein the first precode and the second precode are determined by the third encoding mode, and the to-be-sent data stream is a sum of the first to-be-sent data stream and the second to-be-sent data stream.

19. The apparatus according to claim 18, wherein:
a product of the first precode and the first channel matrix is greater than a first threshold, and a product of the first precode and the second channel matrix is less than or equal to the first threshold; and
a product of the second precode and the second channel matrix is greater than a second threshold, and a product of the second precode and the first channel matrix is less than or equal to the second threshold.

20. The apparatus according to claim 18, wherein:
the first encoding mode is a closed-loop precoding mode, and the instructions further cause the processor to:
  determine that the product of the first channel matrix and the first precode is a first equivalent channel matrix; and
  determine the first encoded data stream according to the first encoding mode and the first equivalent channel matrix; or
the second encoding mode is a closed-loop precoding mode, and the instructions further cause the processor to:
  determine that the product of the second channel matrix and the second precode is a second equivalent channel matrix; and
  determine the second encoded data stream according to the second encoding mode and the second equivalent channel matrix.

* * * * *